United States Patent
Emoto et al.

(10) Patent No.: US 11,326,801 B2
(45) Date of Patent: May 10, 2022

(54) ENVIRONMENTAL APPARATUS CONTROLLER WITH LEARNING CONTROL BASED ON USER CONDITION

(71) Applicants: DAIKIN INDUSTRIES, LTD., Osaka (JP); NEC CORPORATION, Tokyo (JP)

(72) Inventors: Shiori Emoto, Osaka (JP); Atsushi Nishino, Osaka (JP); Satoshi Hashimoto, Osaka (JP); Shouta Hori, Osaka (JP); Junya Nakase, Osaka (JP); Masanori Tsujikawa, Tokyo (JP); Yukihiro Kiuchi, Minato-ku Tokyo (JP); Toshinobu Ogatsu, Minato-ku Tokyo (JP)

(73) Assignees: Daikin Industries, Ltd., Osaka (JP); NEC CORPORATION, Tokyo (JP)

( * ) Notice: Subject to any disclaimer, the term of this patent is extended or adjusted under 35 U.S.C. 154(b) by 158 days.

(21) Appl. No.: 16/633,516

(22) PCT Filed: Jul. 24, 2018

(86) PCT No.: PCT/JP2018/027723
§ 371 (c)(1),
(2) Date: Jan. 23, 2020

(87) PCT Pub. No.: WO2019/022079
PCT Pub. Date: Jan. 31, 2019

(65) Prior Publication Data
US 2020/0224916 A1 Jul. 16, 2020

(30) Foreign Application Priority Data
Jul. 26, 2017 (JP) .............................. JP2017-144975

(51) Int. Cl.
*F24F 11/65* (2018.01)
*F24F 11/77* (2018.01)
(Continued)

(52) U.S. Cl.
CPC .............. *F24F 11/65* (2018.01); *F24F 11/77* (2018.01); *G06N 3/08* (2013.01); *F24F 2110/10* (2018.01);
(Continued)

(58) Field of Classification Search
None
See application file for complete search history.

(56) References Cited

U.S. PATENT DOCUMENTS

2004/0245351 A1* 12/2004 Orfield ..................... F24F 11/30
236/43
2016/0054023 A1* 2/2016 Baker .................. H05B 47/115
307/31
(Continued)

FOREIGN PATENT DOCUMENTS

JP 2005-127690 A 5/2005
JP 2011-101746 A 5/2011
(Continued)

OTHER PUBLICATIONS

International Preliminary Report of corresponding PCT Application No. PCT/JP2018/027723 dated Feb. 6, 2020.
(Continued)

*Primary Examiner* — Bernard G Lindsay
(74) *Attorney, Agent, or Firm* — Global IP Counsels, LLP

(57) ABSTRACT

An environmental apparatus controller performs control over multiple types of environmental apparatuses, and includes a grasping unit, learning control plan output means, and a selection control unit. The grasping unit grasps current (Continued)

mental and physical condition information of a user, environmental situation information, and target relationship information between a target mental and physical condition and a present mental and physical condition. The learning control plan output means outputs a control change plan for each combination of multiple types of the environmental apparatuses according to the current mental and physical condition information, the environmental situation information, and the target relationship information. The selection control unit selects one of a plurality of the control change plans output by the learning control plan output means and executes the plan. The learning control plan output means performs learning such that a method of determining the control change plans to be output is updated.

14 Claims, 6 Drawing Sheets

(51) Int. Cl.
    *G06N 3/08*     (2006.01)
    *F24F 110/20*     (2018.01)
    *F24F 110/70*     (2018.01)
    *F24F 110/10*     (2018.01)

(52) U.S. Cl.
    CPC ....... *F24F 2110/20* (2018.01); *F24F 2110/70* (2018.01)

(56) References Cited

U.S. PATENT DOCUMENTS

| | | | |
|---|---|---|---|
| 2016/0334121 A1 | 11/2016 | Oobayashi | |
| 2016/0341436 A1* | 11/2016 | Parker | H05B 47/155 |
| 2018/0225113 A1* | 8/2018 | Hasegawa | B25J 9/161 |
| 2020/0037416 A1* | 1/2020 | Oobayashi | H05B 47/155 |

FOREIGN PATENT DOCUMENTS

| | | |
|---|---|---|
| JP | 2014-234934 A | 12/2014 |
| WO | 2015107607 A1 | 7/2015 |

OTHER PUBLICATIONS

International Search Report of corresponding PCT Application No. PCT/JP2018/027723 dated Oct. 2, 2018.

\* cited by examiner

| | AIR CONDITIONER | VENTILATOR | AROMA DIFFUSER |
|---|---|---|---|
| CONTROL PLAN A | PRESET TEMPERATURE −2 | OFF | OFF |
| CONTROL PLAN B | PRESET TEMPERATURE −1 | ON | OFF |
| CONTROL PLAN C | PRESET TEMPERATURE ±0 | ON | ON (FOR IMPROVING AROUSAL LEVEL) |
| ... | ... | ... | ... |

FIG. 3

| | AIR CONDITIONER | VENTILATOR | AROMA DIFFUSER |
|---|---|---|---|
| CONTROL PLAN P | PRESET TEMPERATURE +2 | OFF | OFF |
| CONTROL PLAN Q | PRESET TEMPERATURE +3 | ON | OFF |
| CONTROL PLAN R | PRESET TEMPERATURE +2 | ON | ON (FOR DECREASING AROUSAL LEVEL) |
| ... | ... | ... | ... |

FIG. 4

ENVIRONMENTAL APPARATUS CONTROLLER WITH LEARNING CONTROL BASED ON USER CONDITION

CROSS-REFERENCE TO RELATED APPLICATIONS

This U.S. National stage application claims priority under 35 U.S.C. § 119(a) to Japanese Patent Application No. 2017-144975, filed in Japan on Jul. 26, 2017, the entire contents of which are hereby incorporated herein by reference.

BACKGROUND

Field of the Invention

The present invention relates to an environmental apparatus controller.

Background Information

Hitherto, it is desired to provide an environment that is able to increase the working efficiency of a worker by using an environmental apparatus, such as an air conditioner and an illumination installation.

For example, it is proposed in a working environment control system described in Japanese Unexamined Patent Application Publication No. 2011-101746 to achieve a target illuminance, temperature, and humidity by setting a target mental and physical condition based on the correlation between a mental and physical condition of a worker and an environmental condition and controlling an illumination apparatus and an air-conditioning apparatus such that a good working environment is constructed based on the correlation between a mental and physical condition and an environmental condition so as to achieve the set target mental and physical condition.

SUMMARY

In the above-described existing system, it is based on the assumption that an illuminance, a temperature, and a humidity are uniquely determined for an arousal level of a user, and improvement in the working efficiency of the user is achieved by achieving an illuminance, a temperature, and a humidity that are an environment target corresponding to a target electrocardiogram HF through control over the illumination apparatus and the air-conditioning apparatus.

Incidentally, actually, the arousal level of a user is complex and does not uniquely settle based on an illuminance, a temperature, and a humidity, and varies with various factors, such as a season and the interrelation among an illuminance, a temperature, and a humidity.

However, for a complex index that various factors like the mental and physical condition of a user influence, even when an attempt to control an environmental apparatus is made in order to optimize the mental and physical condition, it is actually required to perform an extremely complex simulation, such as conducting a study of influence on the mental and physical condition of a user when the factors are changed one by one. Particularly, it is required to consider the effects of a plurality of the factors that influence the mental and physical condition of a user, so there will be an enormous amount of information processing. In other words, when control over a plurality of environmental apparatuses is changed, the mental and physical condition of a user presumably changes with a change of control over each of the environmental apparatuses. In order to determine the status of control over an illumination apparatus or an air-conditioning apparatus for achieving an optimal mental and physical condition, it is required to consider the effect of the influence of illuminance adjustment using the illumination apparatus on the mental and physical condition of a worker and the effect of the influence of temperature or humidity adjustment using the air-conditioning apparatus on the mental and physical condition of a worker, so the computational load is extremely huge.

In the first place, a model of simulation incorporating all the factors that influence the mental and physical condition of a user has not been studied so far, and it is difficult to attempt the above-described simulation in itself.

Therefore, it has not been realistic with the technology so far and has been substantially impossible to control a plurality of environmental apparatuses such that the mental and physical condition of a user is brought close to a target condition.

A task of the present invention is made in view of the above-described points, and is to provide an environmental apparatus controller that is able to immediately execute control for improving the mental and physical condition of a user.

An environmental apparatus controller according to a first aspect is an environmental apparatus controller for performing control over multiple types of environmental apparatuses, and includes a grasping unit, learning control plan output means, and a selection control unit. The grasping unit is configured to grasp current mental and physical condition information on a current mental and physical condition of a user, environmental situation information, and target relationship information representing a relationship between a target mental and physical condition and a current mental and physical condition. The learning control plan output means is configured to output a control change plan for each combination of multiple types of the environmental apparatuses according to the current mental and physical condition information, the environmental situation information, and the target relationship information. The selection control unit is configured to select, based on a predetermined condition, one of a plurality of the control change plans output by the learning control plan output means and execute the one of the control change plans. The learning control plan output means is configured to perform learning such that a method of determining the control change plans to be output is updated by using the mental and physical condition of the user, having changed as a result of executing the control change plan selected by the selection control unit.

Information on the mental and physical condition of the user is not limited, and may include, for example, various pieces of information, such as arousal level, autonomic nerve balance such as LF/HF, a degree of drowsiness, a degree of tension, a degree of sweating, body temperature, body surface temperature, face, and voice.

With this environmental apparatus controller, when a plurality of environmental apparatuses is controlled, a plurality of control change plans is output without incorporating each time the influence or effect of control over the environmental apparatuses on the mental and physical condition of the user, and one of the output control change plans is selected based on a predetermined condition, with the result that it is possible to quickly determine control details. The learning control plan output means performs learning to update a method of determining control change plans to be output by using a change of the mental and physical condition of the user in the case where the control details of the selected control change plan are executed, so it is possible to output control change plans having a high efficiency to bring the mental and physical condition of the user close to a target condition through learning and execute one of the control change plans.

An environmental apparatus controller according to a second aspect is the environmental apparatus controller according to the first aspect, and the mental and physical condition of the user is an arousal level of the user.

An arousal level is not limited, and may be, for example, the one that is determined based on the condition of the heart rate of the user, may be the one that is determined based on the face of the user, may be determined based on the temperature of the skin of the user, may be the one that is determined based on the number of breaths of the user per unit time, may be the one that is determined based on the brain waves of the user, or may be the one that is determined based on a combination of these.

With this environmental apparatus controller, it is possible to bring the arousal level of the user close to a target arousal level state.

An environmental apparatus controller according to a third aspect is the environmental apparatus controller according to the first aspect or the second aspect, and the learning control plan output means is computing means using a neural network.

With this environmental apparatus controller, it is possible to output multiple types of control change plans by using a neural network.

An environmental apparatus controller according to a fourth aspect is the environmental apparatus controller according to any one of the first aspect to the third aspect, and the selection control unit is configured to, when the selection control unit selects one of the plurality of control change plans output by the learning control plan output means, select while rotating combination patterns of multiple types of the environmental apparatuses.

With this environmental apparatus controller, a control plan is selected and executed while combination patterns of multiple types of the environmental apparatuses are rotated, so it is possible to provide variations of combination patterns of multiple types of the environmental apparatuses, which can be learned, and, therefore, it is possible to enhance learning efficiency.

An environmental apparatus controller according to a fifth aspect is the environmental apparatus controller according to any one of the first aspect to the fourth aspect, and the multiple types of environmental apparatuses include at least two or more of an apparatus configured to adjust temperature, an apparatus configured to adjust humidity, an apparatus configured to adjust a concentration of carbon dioxide, and an apparatus configured to provide fragrance.

With this environmental apparatus controller, it is possible to bring the mental and physical condition of the user close to a target condition by using at least any two or more of the apparatus configured to adjust temperature, the apparatus configured to adjust humidity, the apparatus configured to adjust a concentration of carbon dioxide, and the apparatus configured to provide fragrance.

An environmental apparatus controller according to a sixth aspect is the environmental apparatus controller according to any one of the first aspect to the fifth aspect, and the learning control plan output means has initial control change plans for each combination of multiple types of the environmental apparatuses according to initial ones of the current mental and physical condition information, the environmental situation information, and the target relationship information before the learning is performed so as to be able to output the initial control change plans.

With this environmental apparatus controller, even in the stage before the learning control plan output means performs learning, the learning control plan output means has initial control change plans for each combination of multiple types of the environmental apparatuses according to initial ones of the current mental and physical condition information, the environmental situation information, and the target relationship information before the learning is performed, so it is possible to quickly output multiple types of control change plans.

With the environmental apparatus controller according to the first aspect, while control details are quickly determined, high-efficiency control change plans to bring the mental and physical condition of the user close to a target condition can be output and executed through learning.

With the environmental apparatus controller according to the second aspect, it is possible to bring the arousal level of the user close to a target arousal level state.

With the environmental apparatus controller according to the third aspect, it is possible to output multiple types of control change plans by using a neural network.

With the environmental apparatus controller according to the fourth aspect, it is possible to provide variations of combination patterns of multiple types of the environmental apparatuses, which can be learned, and it is possible to enhance learning efficiency.

With the environmental apparatus controller according to the fifth aspect, it is possible to bring the mental and physical condition of the user close to a target condition by using at least any two or more of the apparatus configured to adjust temperature, the apparatus configured to adjust humidity, the apparatus configured to adjust a concentration of carbon dioxide, and the apparatus configured to provide fragrance.

With the environmental apparatus controller according to the sixth aspect, even in the stage before the learning control plan output means performs learning, it is possible to quickly output multiple types of control change plans.

BRIEF DESCRIPTION OF THE DRAWINGS

FIG. 3 is a table that shows an example of multiple types of control plans at the time of increasing the arousal level of a user by one.

FIG. 4 is a table that shows an example of multiple types of control plans at the time of decreasing the arousal level of a user by one.

DETAILED DESCRIPTION OF EMBODIMENT(S)

Hereinafter, an environmental apparatus control system to which an environmental apparatus controller is adopted will be described by way of one embodiment as an example; however, the present invention is not limited thereto.

(1) General Schematic Configuration of Environmental Apparatus Control System

Figure 1:
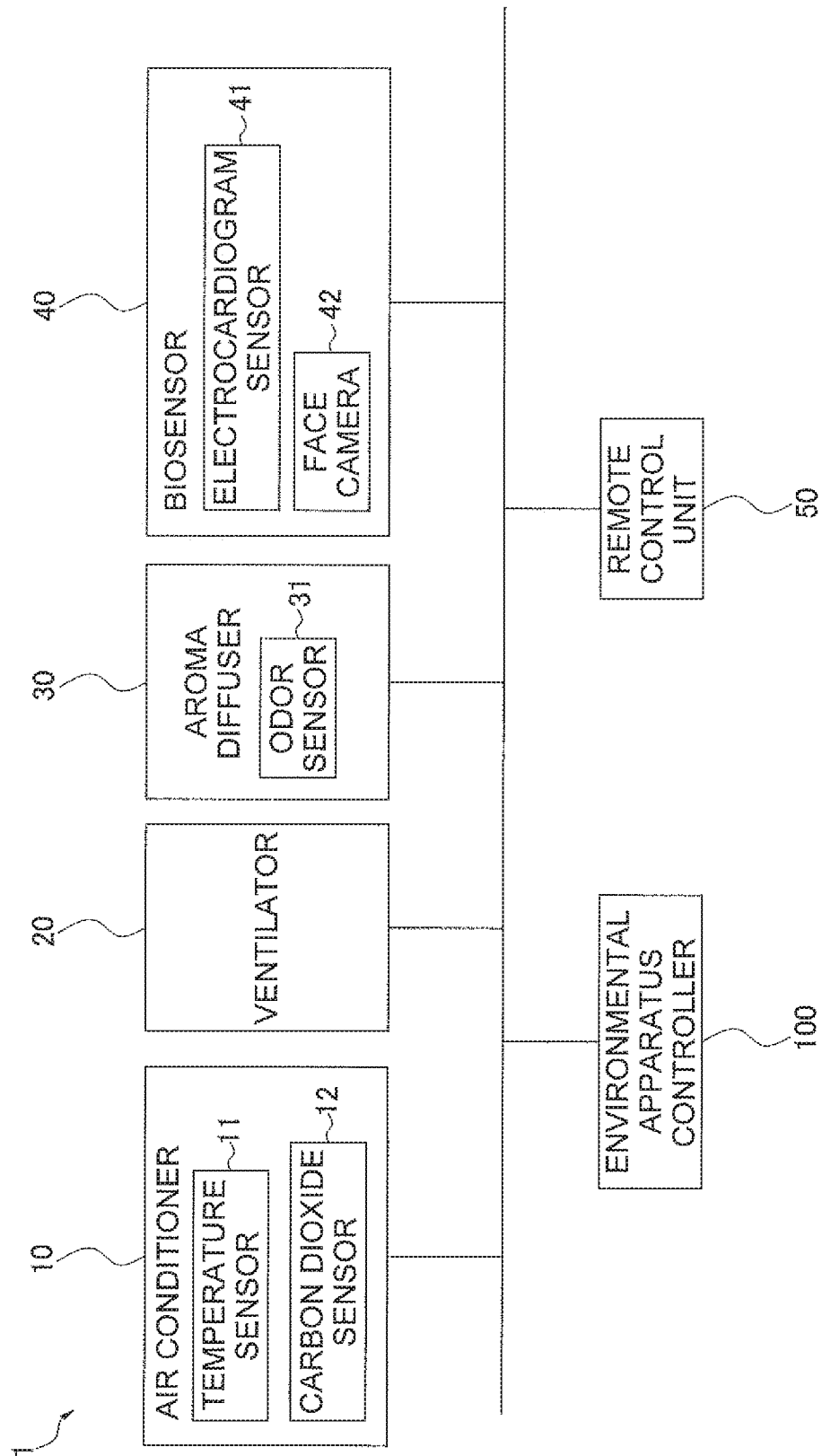
FIG. 1 is a general schematic configuration diagram of an environmental apparatus control system.

FIG. 1 is a general schematic configuration diagram of the environmental apparatus control system 1.

The environmental apparatus control system 1 is a system for bringing an arousal level, that is, a mental and physical condition, of a user close to a target arousal level by using multiple types of environmental apparatuses.

The environmental apparatus control system 1 mainly includes an air conditioner 10, a ventilator 20, an aroma diffuser 30, a biosensor 40, a remote control unit 50, and the environmental apparatus controller 100. These devices are connected to one another by wired or wireless connection so as to be communicable with one another.

The air conditioner 10, the ventilator 20, and the aroma diffuser 30 are environmental apparatuses of types different from one another and are apparatuses that are able to control the arousal level of a user.

The air conditioner 10 is an apparatus that is able to adjust the temperature of a room in which a user is present. The air conditioner 10 has a refrigerant circuit that, when a compressor, a condenser, an expansion valve, and an evaporator are connected by connecting an outdoor unit (not shown) and an indoor unit (not shown), is able to perform a refrigeration cycle. The air conditioner 10 includes a temperature sensor 11 that detects air temperature in the room and a carbon dioxide sensor 12 that detects the concentration of carbon dioxide in the room.

The ventilator 20 is an apparatus that is able to provide ventilation in the room in which a user is present, and is able to adjust the concentration of carbon dioxide in the room by providing ventilation in the room through ON/OFF control. The ventilator 20 is configured to include a fan, a ventilation duct, and the like.

The aroma diffuser 30 is an apparatus that is able to supply predetermined fragrance into the room in which a user is present, and is able to adjust the concentration of fragrance in the room through ON/OFF control. The type of fragrance is not limited and is preferably a fragrance that influences the arousal level of a user. The aroma diffuser 30 includes an odor sensor 31 that detects the concentration of fragrance in the room.

The biosensor 40 is a sensor for grasping the arousal level of a user. In the present embodiment, the biosensor 40 includes an electrocardiogram sensor 41 that detects the electrocardiogram waveform of a user and a face camera 42 that detects the face of a user. The electrocardiogram sensor 41 is used when attached to near the heart of a user, and is able to wirelessly send detected electrocardiogram waveform data to a surrounding device, such as the environmental apparatus controller 100. The face camera 42 is placed at a specified position in the room, at which the face of a user can be captured, and is able to wirelessly send detected face data to a surrounding device, such as the environmental apparatus controller 100.

The remote control unit 50 receives, from a user, various input data that is used in the environmental apparatus control system 1. The remote control unit 50 is also configured to be able to operate the air conditioner 10, the ventilator 20, and the aroma diffuser 30. The remote control unit 50 also receives information on a target arousal level from a user. Specifically, the remote control unit 50 receives input of information on the complexity of work that a user does from this time on. The complexity of work may be, for example, classified in advance into multiple levels and configured in a format in which a user selects one level. Generally, when a human does simple work, working efficiency can be increased as the arousal level increases; whereas, when a human does complex work, working efficiency can deteriorate on the contrary when the arousal level is too high (Yerkes-Dodson law). In other words, when complex work is done, there should be an optimal arousal level.

The environmental apparatus controller 100, as will be described later, is an apparatus that performs control over various environmental apparatuses so that the arousal level of a user can be brought close to a target arousal level that is grasped when the remote control unit 50 receives input from the user.

(2) Configuration of Environmental Apparatus Controller 100

Figure 2:
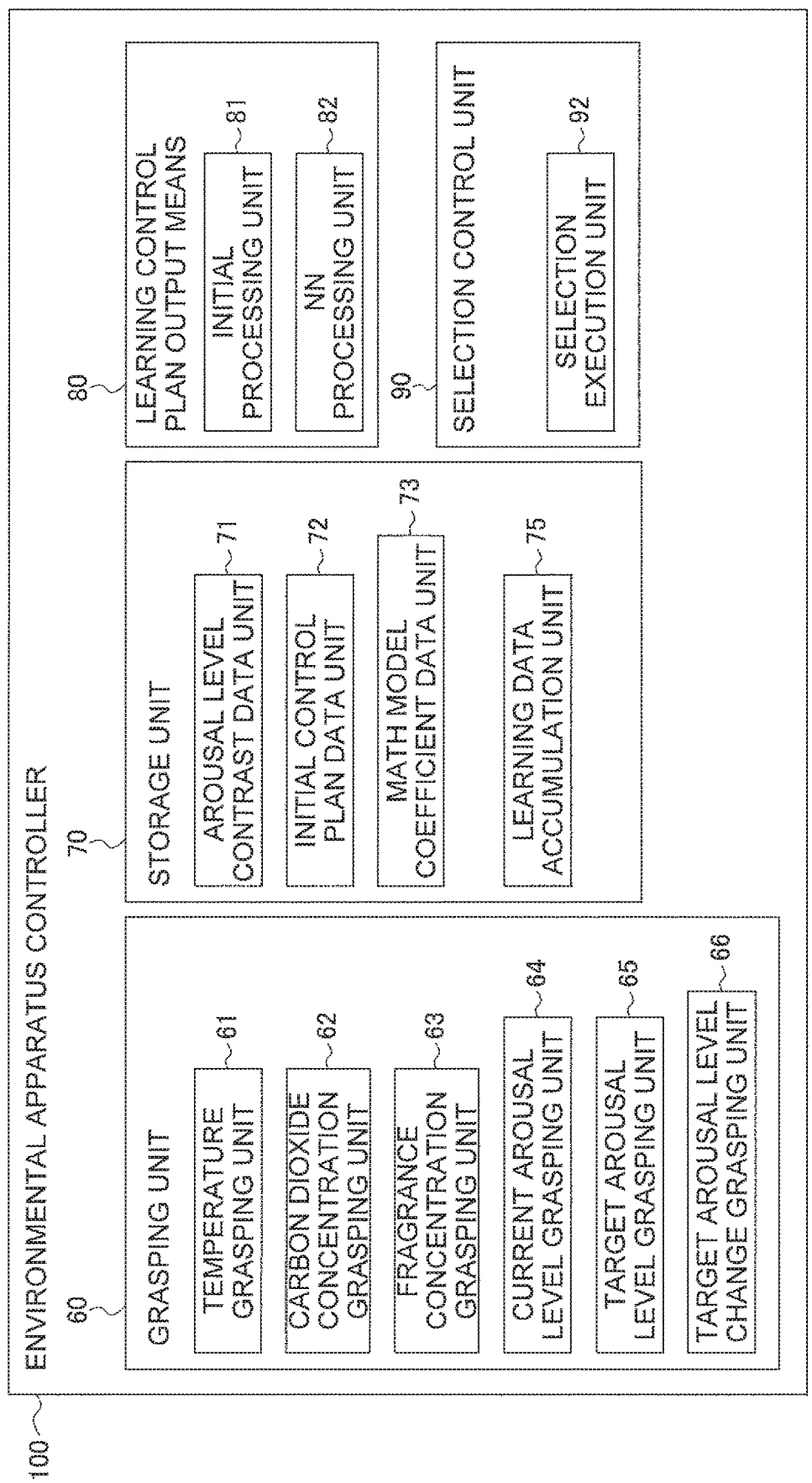
FIG. 2 is a block configuration diagram of an environmental apparatus controller.

FIG. 2 is a functional block configuration diagram of the environmental apparatus controller 100.

The environmental apparatus controller 100 includes a grasping unit 60 for grasping various information, a storage unit 70 for storing various data, learning control plan output means 80 that sets a control plan to be executed by each environmental apparatus, and a selection control unit 90 that executes control over the environmental apparatuses. The environmental apparatus controller 100 is able to acquire information from the biosensor 40 or the remote control unit 50 and control the air conditioner 10, the ventilator 20, and the aroma diffuser 30, and is configured to include one or plurality of CPUs, one or plurality of ROMs, and one or plurality of RAMs.

(2-1) Grasping Unit 60

The grasping unit 60 includes a temperature grasping unit 61, a carbon dioxide concentration grasping unit 62, a fragrance concentration grasping unit 63, a current arousal level grasping unit 64, a target arousal level grasping unit 65, a target arousal level change grasping unit 66, and the like, and is made up of one or plurality of CPUs, one or plurality of RAMs, and the like.

The temperature grasping unit 61 grasps a value detected by the temperature sensor 11 of the air conditioner 10 through communication and holds the value as air temperature in the room in which a user is present.

The carbon dioxide concentration grasping unit 62 grasps a value detected by the carbon dioxide sensor 12 of the air conditioner 10 through communication and holds the value as the concentration of carbon dioxide in the room in which a user is present.

The fragrance concentration grasping unit 63 grasps a value detected by the odor sensor 31 of the aroma diffuser 30 through communication and holds the value as the concentration of fragrance in the room in which a user is present.

The current arousal level grasping unit 64 grasps the arousal level (current arousal level) of a user by consulting the arousal level contrast data unit 71 stored in the storage unit 70 (described later) based on detected details of the electrocardiogram sensor 41 and the face camera 42 that both serve as the biosensor 40.

The target arousal level grasping unit 65 grasps a target arousal level according to the complexity of work received by the remote control unit 50. Specifically, the target arousal level grasping unit 65 grasps an arousal level (target arousal level) such that, when the complexity of work is lower than a predetermined complexity standard, a target arousal level increases as the complexity decreases in accordance with a predetermined relationship and, when the complexity of work is higher than or equal to the predetermined complexity standard, a predetermined arousal level that can increase working efficiency in accordance with Yerkes-Dodson rule is obtained.

The target arousal level change grasping unit 66 grasps a target arousal level change (ΔA) as the difference between the arousal level grasped by the current arousal level grasping unit 64 and the arousal level grasped by the target arousal level grasping unit 65.

(2-2) Storage Unit 70

The storage unit 70 includes an arousal level contrast data unit 71, an initial control plan data unit 72, a math model coefficient data unit 73, a learning data accumulation unit 75, and the like, and is made up of one or plurality of ROMs, one or plurality of RAMs, and the like.

As described above, data for grasping an arousal level to be estimated from detected details of the electrocardiogram sensor 41 and the face camera 42 that both serve as the biosensor 40 is prestored in the arousal level contrast data unit 71. The relationship between an electrocardiogram waveform and an arousal level is set based on publicly known matters. Information that is grasped from the face camera 42 is used to grasp an arousal level based on a publicly known relationship between a face and an arousal level according to a difference from a face that is a predetermined reference as a result of capturing for each user. For example, an arousal level corresponding to an electrocardiogram waveform that is grasped from the electrocardiogram sensor 41 is determined by consulting the prestored relationship data between an electrocardiogram waveform and an arousal level, in addition, an arousal level correction amount corresponding to a difference between a face that is grasped from the face camera 42 and a reference face is acquired by consulting prestored relationship data between a difference in face and an arousal level change, and the initially determined value is corrected by using the acquired arousal level correction amount. Thus, the arousal level of a user may be grasped.

The initial control plan data unit 72 is data to be consulted at the time of determining a control plan by the initial processing unit 81 of the learning control plan output means 80 (described later), and multiple types of initial control plan data that is a combination of control plans of the environmental apparatuses are predetermined according to the value of target arousal level change (ΔA).

Specifically, as an initial control plan for achieving a target arousal level change (ΔA), multiple types of average control plans grasped from tests, or the like, are predetermined for each target arousal level change (ΔA) and stored in the initial control plan data unit 72.

For example, as for a control plan in the case where the target arousal level change (ΔA) is +1, that is, a control plan for increasing the arousal level by one level, multiples types of combinations of control plans of the air conditioner 10, the ventilator 20, and the aroma diffuser 30 are stored, as shown in FIG. 3. Here, as one example of control plan (control plan A) for increasing the arousal level by one level, the preset temperature of the air conditioner 10 is decreased by two degrees, and both the ventilator 20 and the aroma diffuser 30 are set to an OFF state. As another one example of control plan (control plan B) for increasing the arousal level by one level, the preset temperature of the air conditioner 10 is decreased by one degree, the ventilator 20 is set to an ON state, and the aroma diffuser 30 is set to an OFF state. Furthermore, as another one example of control plan (control plan C) for increasing the arousal level by one level, the ventilator 20 is set to an ON state without changing the preset temperature of the air conditioner 10, and the aroma diffuser 30 is set to an ON state by using an aroma of a type for increasing the arousal level.

For example, as for a control plan in the case where the target arousal level change (ΔA) is −1, that is, a control plan for lowering the arousal level by one level, multiple types of combinations of control plans of the air conditioner 10, the ventilator 20, and the aroma diffuser 30 are stored, as shown in FIG. 4. Here, as one example of control plan (control plan P) for decreasing the arousal level by one level, the preset temperature of the air conditioner 10 is increased by two degrees, and both the ventilator 20 and the aroma diffuser 30 are set to an OFF state. As another one example of control plan (control plan Q) for decreasing the arousal level by one level, the preset temperature of the air conditioner 10 is increased by three degrees, the ventilator 20 is set to an ON state, and the aroma diffuser 30 is set to an OFF state. Furthermore, as another one example of control plan (control plan R) for decreasing the arousal level by one level, the preset temperature of the air conditioner 10 is increased by two degrees, the ventilator 20 is set to an ON state, and the aroma diffuser 30 is set to an ON state by using an aroma of a type for decreasing the arousal level.

As described above, initial control plans for each combination of a plurality of environmental apparatuses are stored in the initial control plan data unit 72 for each target arousal level change (ΔA).

Data of coefficients of a math model (math model coefficient data) to be consulted at the time of setting the math model that is used at the time of determining a control plan by the NN processing unit 82 of the learning control plan output means 80 (described later) is stored in the math model coefficient data unit 73. The math model coefficient data is updated and overwritten each time learning for incorporating the executed result of a control plan is performed by the NN processing unit 82 of the learning control plan output means 80 (described later).

The learning data accumulation unit 75 stores multiple types of learning data. The learning data is data in which a control plan selected and executed by the selection control unit 90 (described later), measured values of the sensors at that time, and the amount of change in the arousal level of a user after a lapse of a predetermined time (for example, ten minutes later) from a start of execution of the control plan are associated. The learning data is used in learning that the NN processing unit 82 of the learning control plan output means 80 (described later) performs, and the coefficients of the math model are updated.

(2-3) Learning Control Plan Output Means 80

The learning control plan output means 80 includes the initial processing unit 81, the NN processing unit 82, and the like, and is made up of one or plurality of CPUs, one or plurality of RAMs, and the like.

The initial processing unit 81 searches the information stored in the initial control plan data unit 72 of the storage unit 70 for control plan data for achieving the target arousal level change (ΔA) grasped by the target arousal level change grasping unit 66 of the grasping unit 60, and outputs a plurality of control plans in order to select one control plan eventually. With the process of outputting a plurality of control plans, the initial processing unit 81 does not execute each time the process of making a study and determination on influence, effect, and habituation that control details in environmental apparatuses provide to the arousal level of a user, and simply executes the process of searching the information stored in the initial control plan data unit 72 of the storage unit 70 for a plurality of control plans.

The NN processing unit 82 is configured to execute the process of computing a plurality of neural networks (NNs), in which the air temperature in the room, grasped by the temperature grasping unit 61 of the grasping unit 60, the concentration of carbon dioxide, grasped by the carbon dioxide concentration grasping unit 62, the concentration of fragrance, grasped by the fragrance concentration grasping unit 63, the current arousal level grasped by the current arousal level grasping unit 64, and the target arousal level change ($\Delta A$) grasped by the target arousal level change grasping unit 66 are input and multiple types of control plans are output. Each neural network has a math model. The NN processing unit 82 constructs math models by using coefficients that are stored in the math model coefficient data unit 73 while being updated occasionally, and executes the process of computing neural networks. The NN processing unit 82 executes the process of computing neural networks in this way. Thus, the NN processing unit 82 outputs multiple types of control plans that can bring a user close to a target arousal level according to the air temperature in the room, the concentration of carbon dioxide, the concentration of fragrance, the current arousal level, and the target arousal level change ($\Delta A$). Multiple types of control plans that are output here are also used in order to select one control plan eventually. In the process of outputting a plurality of control plans as well, the NN processing unit 82 does not execute each time the process of making a study and determination on influence, effect, and habituation that control details in the environmental apparatuses provide to the arousal level of a user, and executes the process of calculating a plurality of control plans by using the input information and the math models.

(2-4) Selection Control Unit 90

The selection control unit 90 includes a selection execution unit 92, and the like, and is made up of one or plurality of CPUs, one or plurality of RAMs, and the like.

The selection execution unit 92 selects one control plan from among multiple types of control plans output by the NN processing unit 82 of the initial processing unit 81 and executes the one control plan. Here, the selection execution unit 92 selects one control plan from among the multiple types of control plans by rotation. Although not limited, in the present embodiment, the selection execution unit 92 selects a control plan in accordance with a predetermined order of combinations of the environmental apparatuses. When the selection execution unit 92 executes a control plan, various control over the air conditioner 10, the ventilator 20, and the aroma diffuser 30 is executed according to the control plan.

(3) Process that is Executed by Environmental Apparatus Controller 100

Figure 5:
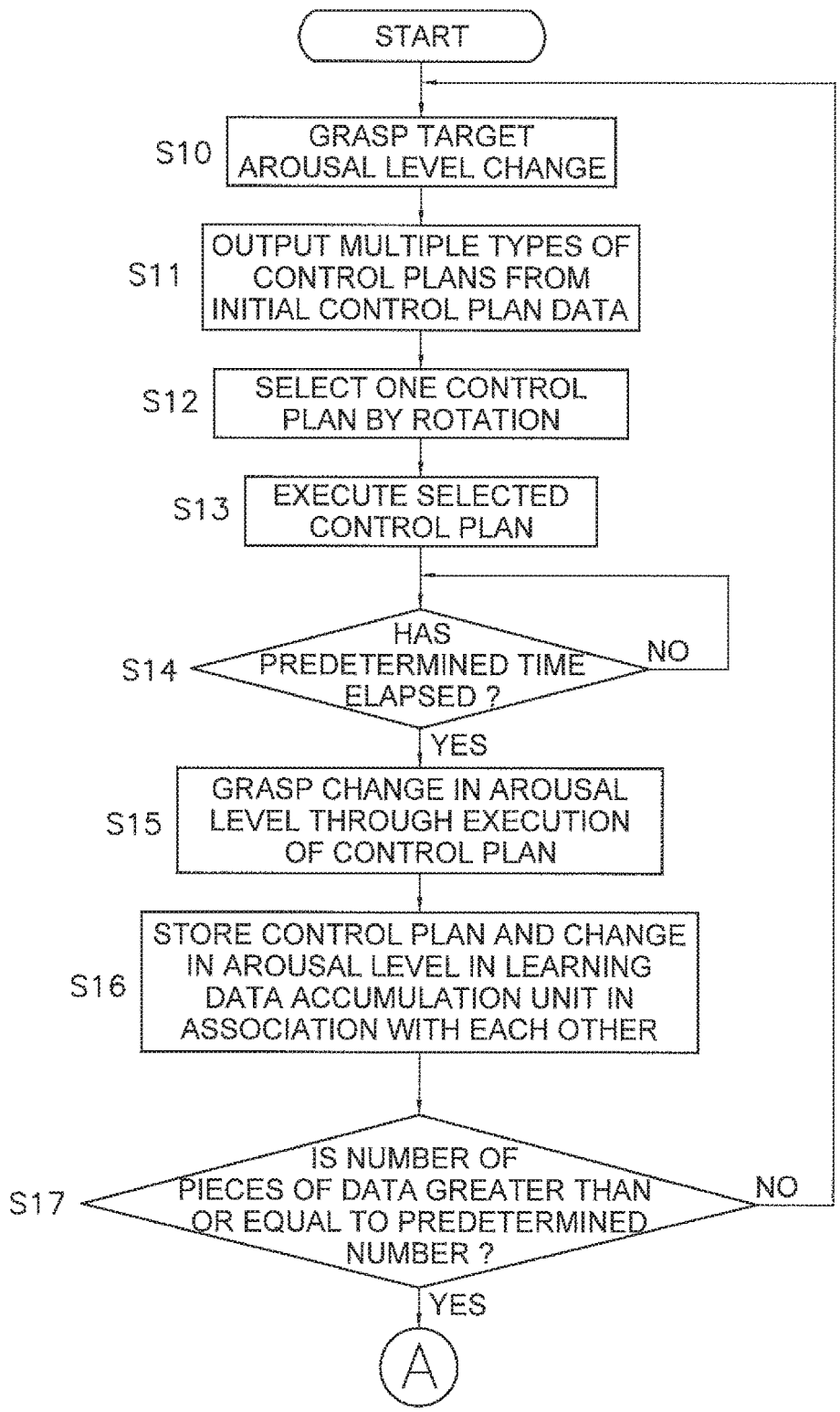
FIG. 5 is a flowchart (part 1) of a process that is executed by the environmental apparatus controller.
Figure 6:
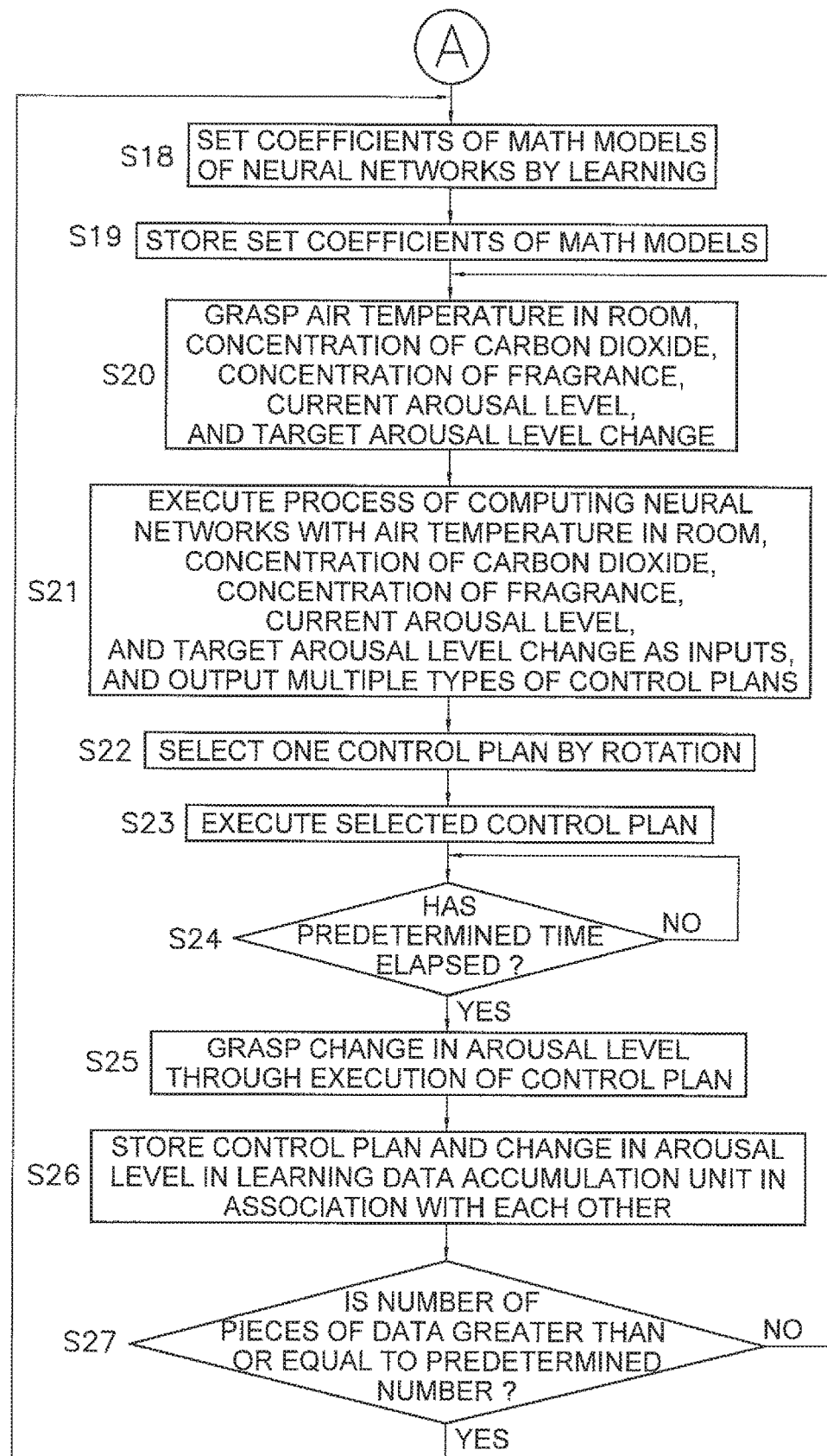
FIG. 6 is a flowchart (part 2) of the process that is executed by the environmental apparatus controller.

FIG. 5 and FIG. 6 show a flowchart of a process that is executed by the environmental apparatus controller 100.

The environmental apparatus controller 100, in the first half of the process, mainly executes a process for acquiring sample data for learning such that math models of neural networks that are able to output a more appropriate control plan are obtained. After learning is performed, a process of continuing further learning while determining a control plan by using the math models obtained through learning is executed. Hereinafter, the flow of the processes will be described.

In step S10, the grasping unit 60 grasps various information. Specifically, a target arousal level change ($\Delta A$) is grasped.

In step S1, the initial processing unit 81 searches the information stored in the initial control plan data unit 72 for control plan data for achieving the target arousal level change ($\Delta A$) grasped in step S10, and outputs multiple types of control plans.

In step S12, the selection execution unit 92 selects one control plan from among the multiple types of control plans output by the initial processing unit 81. Here, the selection execution unit 92 selects one control plan by rotation.

In step S13, the selection execution unit 92 executes the control plan selected in step S12, and controls the air conditioner 10, the ventilator 20, and the aroma diffuser 30, thus changing an indoor environment.

In step S14, the selection execution unit 92 determines whether a predetermined time has elapsed from the start of the control plan in step S13. Here, when it is determined that the predetermined time has elapsed, the process proceeds to step S15; whereas, when it is determined that the predetermined time has not elapsed, the process waits until the predetermined time elapses.

In step S15, the selection execution unit 92 grasps a change in arousal level by comparing the arousal level grasped by the current arousal level grasping unit 64 before execution of the control plan in step S13 with the arousal level grasped by the current arousal level grasping unit 64 after execution of the control plan for the predetermined time in step S13.

In step S16, the selection execution unit 92 stores information on the control plan executed in step S13 and the change in arousal level, grasped in step S15, in the learning data accumulation unit 75 in association with each other.

In step S17, the selection execution unit 92 determines whether the number of pieces of data (the number of sets of information on a control plan and a change in arousal level) stored in the learning data accumulation unit 75 has reached a predetermined number or greater. Here, when it is determined that the number of pieces of data is greater than or equal to the predetermined number, the process proceeds to step S18 (the process proceeds from the portion indicated by A in FIG. 5 to the portion indicated by A in FIG. 6); whereas, when it is determined that the number of pieces of data is less than the predetermined number, the process returns to step S10, the above-described processes are repeated, and the accumulation amount of learning data is increased.

In step S18, since data is sufficiently stored in the learning data accumulation unit 75, the NN processing unit 82 performs learning by using these pieces of data to generate or update the coefficients of the math models of the neural networks. Specifically, by setting the coefficients of the math models of the neural networks through the learning, the NN processing unit 82 learns how the arousal level of a user changes when the environment is changed in which way under what environment in what arousal level state that the user is.

In step S19, the NN processing unit 82 stores the coefficients of the math models, set in step S18, in the math model coefficient data unit 73 (update coefficient data).

In step S20, the grasping unit 60 grasps various information again. Specifically, air temperature in the room, the concentration of carbon dioxide, the concentration of fragrance, a current arousal level, and a target arousal level change ($\Delta A$) each are grasped.

In step S21, the NN processing unit 82 constructs math models of neural networks by using the coefficient data stored in the math model coefficient data unit 73. The NN processing unit 82 executes the process of computing the neural networks with the air temperature in the room, the concentration of carbon dioxide, the concentration of fragrance, the current arousal level, and the target arousal level change ($\Delta A$) as inputs. Thus, the NN processing unit 82 outputs multiple types of control plan data for achieving the target arousal level change ($\Delta A$) grasped in step S20.

In step S22, the selection execution unit 92 selects one control plan from among the multiple types of control plans output by the NN processing unit 82. Here, the selection execution unit 92 selects one control plan by rotation.

In step S23, the selection execution unit 92 executes the control plan selected in step S22, and changes the indoor environment by controlling the air conditioner 10, the ventilator 20, and the aroma diffuser 30.

In step S24, the selection execution unit 92 determines whether a predetermined time has elapsed from the start of the control plan in step S23. Here, when it is determined that the predetermined time has elapsed, the process proceeds to step S25; whereas, when it is determined that the predetermined time has not elapsed, the process waits until the predetermined time elapses. The predetermined time here is similar to that in step S14.

In step S25, the selection execution unit 92 grasps a change in arousal level by comparing the arousal level grasped by the current arousal level grasping unit 64 before execution of the control plan in step S23 with the arousal level grasped by the current arousal level grasping unit 64 after execution of the control plan for the predetermined time in step S23.

In step S26, the selection execution unit 92 stores information on the control plan executed in step S23 and the change in arousal level, grasped in step S25, in the learning data accumulation unit 75 in association with each other.

In step S27, the selection execution unit 92, after the last learning is performed, determines whether the number of pieces of data (the number of sets of information on a control plan and a change in arousal level) stored in the learning data accumulation unit 75 has reached a predetermined number or greater. Here, when it is determined that the number of pieces of data is greater than or equal to the predetermined number, the process proceeds to step S18, and learning is performed again. When it is determined that the number of pieces of data is less than the predetermined number, the process returns to step S20, the above-described processes are repeated, and the accumulation amount of learning data is increased.

(4) Characteristics of Embodiment (4-1)

The environmental apparatus controller 100 of the present embodiment is able to output a plurality of control plans according to a target arousal level change ($\Delta A$) by the initial processing unit 81 just consulting the initial control plan data. The NN processing unit 82 is also able to output a plurality of control plans by just executing the process of computing neural networks each having a math model that is constructed by using the math model coefficient data. For the plurality of control plans output in this way, the control plans are not compared with each other, and one control plan is selected and executed by the selection execution unit 92 in accordance with simple rotation.

Therefore, the computing process for making a study and determination on influence (influence of arousal level) and effect that a user receives as a result of control over the environmental apparatuses is not executed each time before one control plan is selected and executed, so it is possible to quickly select and execute one control plan by reducing a computational load. Therefore, it is possible to perform in real time control over the environmental apparatuses to provide an arousal level that a user desires, so it is possible to early achieve the arousal level that the user desires.

The environmental apparatus controller 100 updates the coefficients of math models of neural networks by performing learning using a plurality of pieces of learning data each made up of a set of an executed control plan and a change in the arousal level of a user resulting from execution of the control plan. Thus, it is possible to construct math models that reflect the tendency of a change in the arousal level of a user as a result of incorporating an effect and habituation caused by control over the environmental apparatuses. From above, as the learning is continued, it is possible to output control plans that more accurately reflect the tendency of the arousal level of a user through the process of computing neural networks.

(4-2)

The environmental apparatus controller 100 of the present embodiment is able to control the air conditioner 10, the ventilator 20, and the aroma diffuser 30 that are environmental apparatuses of types different from one another by uniformly using an arousal level that is the same index. In other words, control is not performed by using different indexes for the environmental apparatuses like, for example, the temperature is used as an index of control over the air conditioner 10 and the concentration of fragrance is used as an index of control over the aroma diffuser 30, but a uniform index, that is, arousal level, is used in control over the environmental apparatuses. For this reason, in the case where control over the environmental apparatuses is changed, influence on different indexes is not considered in a complicated manner, but influence on an arousal level that is a uniform index can be simply studied.

In control over the environmental apparatuses, an index such as temperature and fragrance concentration from which users have different feelings is not used but a uniform index, that is, an arousal level, is used, so it is possible to reduce a difference in feeling among users. Particularly, in the above-described embodiment, learning is performed by using not only arousal level itself but also learning data containing a change in arousal level, and these are incorporated as the coefficients of the math models that the NN processing unit 82 has. Therefore, it is also possible to reduce an individual difference in change in arousal level among users. From above, information that the NN processing unit 82 having performed learning a predetermined amount or more has (information on math models containing coefficients) is highly general information and more easily provides a certain effect even in the case where the information is used in an apparatus that is used for another user, other than the environmental apparatus controller 100 of the present embodiment.

(4-3)

In the environmental apparatus controller 100 of the present embodiment, any one is selected and executed from among multiple types of control plans for the environmental apparatuses. Particularly, in the present embodiment, not a control plan specific to a specified environmental apparatus is only selected and continued to be executed but any one control plan is selected and executed by rotation.

Therefore, an environmental change given to a user as a result of executing a control plan is not limited to an environmental change of a specific type, such as a temperature change, and it is possible to supply various environmental changes, such as a change in the concentration of carbon dioxide, a change in the concentration of fragrance, and a combination of these changes.

Thus, it is possible to reduce an insensitive change in arousal level against an environmental change of the same type (for example, habituation of a user against a temperature change when only a temperature change is continuously performed as an environmental change) as a result of a user continuing to receive supply of an environmental change of the same type.

From above, the environmental apparatus controller 100 is able to continue ensuring a sufficient change in the arousal level of a user when the environmental apparatus controller 100 executes a control plan, so it is also possible to improve the arousal level of a user.

(4-4)

With the environmental apparatus controller 100 of the present embodiment, a target arousal level is grasped by using information on the complexity of work that a user does from this time on, received by the remote control unit 50.

When the complexity of work is higher than or equal to the predetermined complexity standard, an unnecessarily high target arousal level is not set, and a predetermined specified arousal level is set as a target arousal level.

For this reason, when the complexity of work is higher than or equal to the predetermined complexity standard and the current arousal level of a user is in an excessively aroused state exceeding the predetermined specified target arousal level, a control plan for actively decreasing the arousal level of (actively relaxing) the user is selected and executed by the environmental apparatus controller 100.

In this way, the environmental apparatus controller 100 is able to provide an environment for achieving an arousal level that provides good working efficiency according to the complexity of work that a user does.

(5) Modifications

In the above-described embodiment, an example of the embodiment of the present invention is described; however, the above-described embodiment is not intended to limit the invention of the subject application, and the invention of the subject application is not limited to the above-described embodiment. The invention of the subject application, of course, encompasses modes modified as needed without departing from the scope.

The above-described embodiment and a plurality of modifications described below may be combined as needed without any contradiction from each other.

(5-1) Modification A

In the above-described embodiment, the case where the selection execution unit 92 selects and executes one of multiples types of control plans output by the initial processing unit 81 or the NN processing unit 82 in accordance with simple rotation is described as an example.

However, for example, the selection execution unit 92 does not select one of multiple types of control plans in accordance with simple rotation, and may select a control plan less relevant to a control plan selected and executed first. Determination as to whether it is less relevant is not limited, and determination may be made in accordance with a predetermined criterion for determination. For example, when the aroma diffuser 30 is not used (in an OFF state) in the last control plan, a control plan in which the aroma diffuser 30 is used (in an ON state) may be preferentially selected as a control plan to be selected subsequently.

In this way, by selecting and executing a less relevant control plan, data having significantly different properties can be collected as learning data, so it is possible to further quickly construct math models that reflect the tendency of the arousal level of a user by improving learning efficiency.

(5-2) Modification B

In the above-described embodiment, the case where an arousal level that is an example of the mental and physical condition of a user is estimated based on detected details of the electrocardiogram sensor 41 and the face camera 42 that both serve as the biosensor 40 is described as an example.

In contrast to this, the mental and physical condition of a user is not limited thereto, and, for example, various information, such as the degree of drowsiness, degree of tension, degree of sweating, and autonomic nerve balance of a user, can be used. Measurement or estimation of these degree of drowsiness, degree of tension, degree of sweating, and autonomic nerve balance of a user can be performed by using a publicly known technology.

When autonomic nerve balance is set for a management evaluation object as the mental and physical condition of a user, a sympathetic nerve activity index (LF/HF) that is calculated based on the pattern of heart beat or the pattern of pulsation can be used. A sympathetic nerve activity index (LF/HF) can be grasped by using a publicly known measurement apparatus over a user. When a sympathetic nerve activity index (LF/HF) is used as the mental and physical condition of a user, it is possible to grasp a highly reliable value as a condition on the sympathetic nerve of the user, and the index can be grasped immediately by using a publicly known measurement apparatus, so it is possible to control environmental apparatuses in real time according to the sympathetic nerve activity index (LF/HF) of a user.

These indexes may be used as indexes representing the mental and physical condition of a user not only in the example of the above-described embodiment but also in the example of the modifications, and the like.

(5-3) Modification C

In the above-described embodiment, the air conditioner 10, the ventilator 20, and the aroma diffuser 30 are, for example, described as environmental apparatuses.

However, environmental apparatuses are not limited to these, and, for example, a lighting apparatus may be used to change the arousal level of a user by adjusting the illuminance in the room or a sound system (including a speaker, or the like) that is able to provide multiple types of sounds having different rhythms may be used to change the arousal level of a user. When a lighting apparatus is used, control is performed to, for example, increase the illuminance to improve the arousal level of a user and decrease the illuminance to decrease the arousal level of a user. When a sound system is used, control is performed to, for example, play high-tempo music to improve the arousal level of a user and play slow-tempo music to decrease the arousal level of a user.

In the above-described embodiment, the case where the ventilator 20 or the aroma diffuser 30 is simply subjected to ON/OFF control is described as an example. Alternatively, the arousal level of a user may be adjusted according to the volume of ventilating air by using the ventilator 20 that is able to control the volume of ventilating air, or the arousal level of a user may be adjusted according to the amount of injection of fragrance by using the aroma diffuser 30 that is able to control the amount of injection. The aroma diffuser 30 may have a fragrance for improving the arousal level of a user and a fragrance for decreasing the arousal level of a user and may be configured to discharge at least any one of them according to a control plan. Although not limited, a fragrance of lemon may be used as a fragrance for increasing an arousal level, and cedrol may be used as a fragrance for decreasing an arousal level.

The above-described air conditioner 10 may be able to control the humidity in the room and configured to adjust the arousal level of a user through humidity control.

(5-4) Modification D

In the above-described embodiment, the case where notification by way of information display, voice output, or the like, by the environmental apparatus controller 100 is optional without any comment is described as an example.

In contrast to this, for example, the environmental apparatus controller 100 may be configured to display whether a control plan in process is control for increasing an arousal level or control for decreasing an arousal level with a method in which a user is able to visually recognize or may be output by voice with a method in which a user is able to hear. As for display, it is possible to display text information, graphic information, or the like, when the environmental apparatus controller 100 is provided with a display, such as liquid crystal display. When the environmental apparatus controller 100 is provided with a speaker, it is possible to output voice. With this configuration, a user who desires can recognize the tendency of a change in environment being provided to the user, so it is possible to make a user easily recognize the effect of improvement in arousal level, and it is also possible to enhance a feeling of satisfaction of a user. Information as to whether control is to increase an arousal level or to decrease an arousal level can be grasped by using information that the target arousal level change grasping unit 66 holds.

The environmental apparatus controller 100 may be configured to notify a user by way of a display or a speaker of information indicating how much the arousal level of the user himself or herself is assumed to change through a control plan that will be executed from this time on or information indicating how much the arousal level of the user himself or herself has changed through a control plan executed before, as in the case of the above.

Furthermore, when the complexity of work to do from this time on is higher than or equal to the predetermined complexity standard, there is an optimal arousal level, and information on both a current arousal level and an optimal arousal level or a difference therebetween may be notified to a user.

When the environmental apparatus controller 100 is used for a single user, the above-described matters about the single user may be notified. When the environmental apparatus controller 100 is used for a group of a plurality of persons present in the same space, an average of the above-described matters about the plurality of users may be notified. When work having the predetermined complexity standard or higher is being done by a plurality of persons, a frequency distribution of the arousal level of each person may be displayed.

A result of comparison between information about the degree of improvement in productivity in the case where the arousal level is controlled by the environmental apparatus controller 100 and information about the degree of improvement in productivity in the case where control is executed such that a predetermined environmental condition is maintained at a certain level without execution of the control may be notified. Here, as for evaluation of productivity, although not limited, it may be evaluated that productivity increases as the duration of the arousal level in a state close to an arousal level that provides high productivity according to details of work extends. When there is a technique for evaluating actual productivity like, for example, the amount of processing per unit time in simple work, productivity may be evaluated by using the actual processing result.

(5-5) Modification E

In the above-described embodiment, the case where neural networks are used as a learning algorithm that learns a control plan for achieving a target arousal level change is described as an example.

In contrast to this, the learning algorithm is not limited to neural networks, and, for example, a publicly known learning algorithm, such as deep learning, support vector machine, and Bayes estimation, may be used.

(6) Others

In the above-described embodiment, the case where an arousal level is used as an index that represents the mental and physical condition of a user and environmental apparatuses are controlled to achieve a target arousal level by estimating an arousal level using information that is obtained from the user via the biosensor 40 is described as an example.

In contrast to this, when the productivity of a user can be objectively indicated, one that digitizes the productivity of the user may be used instead of using an index that represents the mental and physical condition of the user, such as an arousal level, as an index at the time of performing control over environmental apparatuses.

Here, one that digitizes the productivity of a user is not limited, and may be, for example, the amount of information input per unit time by a user who does information input work, the score of test that a user who is a student of a cram school takes, the amount of program (such as the number of lines of program) created per unit time by a programmer that is a user, the number of persons handled per unit time by a person in charge of a call center, who is a user, or the like.

When such one that digitizes productivity is used as an index as well, similar effects can be obtained by using the one that digitizes productivity instead of an arousal level in the above-described embodiment. In other words, a control plan for environmental apparatuses to achieve a difference between current productivity and target productivity is selected, executed, and learned, so it is possible to obtain similar effects to those of the above-described embodiment.

What is claimed is:

1. An environmental apparatus controller configured to perform control over a plurality of environmental apparatuses of different types, the environmental apparatus controller comprising:
   a grasping unit configured to grasp
      current mental and physical condition information on a current mental and physical condition of a user,
      environmental situation information, and
      target relationship information representing a relationship between a target mental and physical condition and the current mental and physical condition;
   learning control plan output means configured to output a plurality of control change plans according to the current mental and physical condition information, the environmental situation information, and the target relationship information, each of the plurality of control change plans including a different combination of control states for each of the plurality of environmental apparatuses;
   a selection control unit configured to
      select, based on a predetermined condition, one control change plan among the plurality of control change plans output by the learning control plan output means, the selecting being executed by rotation such that the same control change plan is not selected twice in succession, and
      execute the one control change plan; and a learning data accumulation unit that stores, as a piece of learning data, the one control change plan in association with an amount of change in the mental and physical condition of the user, the learning control plan output means being further configured to perform learning such that a method of determining the plurality of control change plans to be output is updated when a number of pieces of the learning data is greater than or equal to a predetermined number.

2. The environmental apparatus controller according to claim 1, wherein the mental and physical condition of the user is an arousal level of the user.

3. The environmental apparatus controller according to claim 1, wherein the learning control plan output means includes a processor using a neural network.

4. The environmental apparatus controller according to claim 1, wherein the plurality of environmental apparatuses include at least two or more of the following types:
an apparatus configured to adjust temperature,
an apparatus configured to adjust humidity,
an apparatus configured to adjust a concentration of carbon dioxide,
an apparatus configured to provide fragrance,
an apparatus configured to adjust illumination, and
an apparatus configured to adjust sound.

5. The environmental apparatus controller according to claim 1, wherein the learning control plan output means has initial control change plans for the plurality of environmental apparatuses, the plurality of initial control change plans being determined according to initial ones of the current mental and physical condition information, the environmental situation information, and the target relationship information before the learning is performed so as to be able to output the initial control change plans.

6. The environmental apparatus controller according to claim 2, wherein the learning control plan output means includes a processor using a neural network.

7. The environmental apparatus controller according to claim 2, wherein the plurality of environmental apparatuses include at least two or more of the following types:
an apparatus configured to adjust temperature,
an apparatus configured to adjust humidity,
an apparatus configured to adjust a concentration of carbon dioxide,
an apparatus configured to provide fragrance,
an apparatus configured to adjust illumination, and
an apparatus configured to adjust sound.

8. The environmental apparatus controller according to claim 2, wherein the learning control plan output means has initial control change plans for the plurality of environmental apparatuses, the plurality of initial control change plans being determined according to initial ones of the current mental and physical condition information, the environmental situation information, and the target relationship information before the learning is performed so as to be able to output the initial control change plans.

9. The environmental apparatus controller according to claim 3, wherein the plurality of environmental apparatuses include at least two or more of the following types:
an apparatus configured to adjust temperature,
an apparatus configured to adjust humidity,
an apparatus configured to adjust a concentration of carbon dioxide,
an apparatus configured to provide fragrance,
an apparatus configured to adjust illumination, and
an apparatus configured to adjust sound.

10. The environmental apparatus controller according to claim 3, wherein the learning control plan output means has initial control change plans for the plurality of environmental apparatuses, the plurality of initial control change plans being determined according to initial ones of the current mental and physical condition information, the environmental situation information, and the target relationship information before the learning is performed so as to be able to output the initial control change plans.

11. The environmental apparatus controller according to claim 4, wherein the learning control plan output means has initial control change plans for the plurality of environmental apparatuses, the plurality of initial control change plans being determined according to initial ones of the current mental and physical condition information, the environmental situation information, and the target relationship information before the learning is performed so as to be able to output the initial control change plans.

12. The environmental apparatus controller according to claim 1, wherein the rotation is simple rotation according to a predetermined order.

13. The environmental apparatus controller according to claim 1, wherein the selection control unit executes the rotation such that a control change plan having a lower relevance with respect to a previously selected control change plan than other control change plans among the plurality of control change plans is selected as the one control change plan.

14. The environmental apparatus controller according to claim 13, wherein the rotation is executed such that an on/off state of at least one apparatus among the plurality of environmental apparatuses is reversed in the one control change plan as compared to the previously selected control change plan.

* * * * *